(12) United States Patent
Kupferman

(10) Patent No.: US 7,372,650 B1
(45) Date of Patent: May 13, 2008

(54) ROTATING MEDIA STORAGE DEVICE HAVING A CALIBRATION TRACK WITH UNIQUE CALIBRATION SERVO SYNCH MARKS

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 544 days.

(21) Appl. No.: 10/873,341

(22) Filed: Jun. 21, 2004

(51) Int. Cl.
*G11B 5/09* (2006.01)

(52) U.S. Cl. .......................................... 360/48; 360/51
(58) Field of Classification Search ...................... None
See application file for complete search history.

(56) References Cited

U.S. PATENT DOCUMENTS 6,429,994 B1 * 8/2002 Le et al. ................... 360/77.02

* cited by examiner

*Primary Examiner*—William Korzuch
*Assistant Examiner*—Daniell L. Negrón
(74) *Attorney, Agent, or Firm*—Blakely, Sokoloff, Taylor & Zafman

(57) ABSTRACT

Disclosed is a rotating media storage device (RMSD) that has at least one calibration track with unique calibration servo synch marks ($SSM_C$s). The RMSD includes a disk that comprises a plurality of tracks including a calibration track having a plurality of normal servo wedges distributed around the calibration track. At least one of the normal servo wedges includes a normal servo synch mark ($SSM_N$). Further, at least one calibration servo wedge is distributed between a pair of normal servo wedges. The calibration servo wedge includes a calibration servo synch mark ($SSM_C$). The calibration $SSM_C$ includes a pattern that is different than the pattern associated with the normal $SSM_N$.

26 Claims, 8 Drawing Sheets

OD AND ID CALIBRATION TRACKS
419, 421

ROTATING MEDIA STORAGE DEVICE HAVING A CALIBRATION TRACK WITH UNIQUE CALIBRATION SERVO SYNCH MARKS

BACKGROUND OF THE INVENTION

1. Field of the Invention

The present invention relates to rotating media storage devices (RMSDs). More particularly, the present invention relates to an RMSD that has at least one calibration track with unique calibration servo synch marks ($SSM_C$s).

2. Description of the Prior Art and Related Information

Computer systems rely on rotating media storage devices (RMSDs), which often employ a moveable head actuator to frequently access large amounts of data stored on the media. One example of an RMSD is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the transducer head over a particular track on the disk to read or write information from and to that track, respectively.

With reference to FIG. 1, FIG. 1 shows an example of a prior art disk 10 having a plurality of concentric tracks 12. Each surface of each disk 10 conventionally contains a plurality of concentric data tracks 12 angularly divided into a plurality of data sectors 15. In addition, special servo information is provided on each disk to determine the position of the moveable transducer head. These tracks 12 are typically referred to as normal tracks.

The most popular form of servo is called "embedded servo" wherein the servo information is written in a plurality of servo wedges 14a, 14b, etc. that are angularly spaced from one another and are interspersed between data sectors 15 around each track of each disk.

Each "Full" servo wedge 14 typically includes a phase lock loop (PLL) field 20, a servo synch mark (SSM) field 22, a track identification (TKID) field 24, a wedge ID field 26 having a binary encoded wedge ID number to identify the wedge, and a group of servo bursts (e.g. ABCD 28—an alternating pattern of magnetic transitions) which the servo control system samples to align the moveable transducer head with or relative to a particular track. In some instances, the servo wedge 14 may only include servo bursts 28 and is referred to as a "Mini-Wedge." This allows for a smaller servo wedge and allows for more space on the track to be devoted to user data.

Typically, the servo control system moves the transducer head toward a desired track during a coarse "seek" mode using the TKID field as a control input. However, in processing information, it is necessary to ensure consistency in the detection of bits composing a block of bits. One common approach directed to ensuring such consistency employs multiple stored fields including a phase lock loop (PLL) field 20 to facilitate bit synchronization and a synch field to facilitate block synchronization. The synch mark field facilitates block synchronization by holding a special marker that is detected to "frame" data, i.e., to identify a boundary of a block. In contemporary hard disk drives employing embedded servos, it is well known to provide framing of servo data via a servo synch mark (SSM) field 22.

Generally, in hard disk drives, a servo synchronization signal based on the head reading a servo synchronization mark (SSM) results in a read/write channel of the disk drive establishing a precise timing reference point for read/write operations.

Once the transducer head is generally over the desired track, the servo control system uses the servo bursts (e.g. ABCD) 28 to keep the transducer head over the track in a fine "track follow" mode. During track following mode, the moveable transducer head repeatedly reads the wedge ID field 26 of each successive servo wedge 14 to obtain the binary encoded wedge ID number that identifies each wedge of the track. In this way, the servo control system continuously knows where the moveable head is relative to the disk.

In some systems, "Mini-Wedges" only having servo bursts 28 are utilized in addition to the "Full Wedges." For example, once the servo control system has acquired the requisite information needed for track following from the Full Wedges, track following can be maintained using the Mini-Wedges. Use of Mini-Wedges allows for a smaller servo wedge and for more space on the track to be devoted to user data, but requires more computationally intensive servo control.

In many of today's disk drives, diagnostic and calibration functions are performed with the aid of specialized calibration tracks. As shown in FIG. 1, typically calibration tracks are located at the outer diameter and the inner diameter of a disk, such as outer diameter calibration track 13A and inner diameter calibration track 13B. Particularly, the calibration tracks are utilized by the servo control system for diagnosis and calibration purposes.

Turning to FIG. 2, FIG. 2 illustrates an example of calibration tracks at the outer and/or inner diameter of a typical disk drive. Generally, a calibration track includes a plurality of normal servo wedges, which may be Full Wedges or Mini-Wedges, distributed around the calibration track. Further, a plurality of calibration wedges are distributed between the normal wedges. FIG. 2 only shows two calibration servo wedges 29, however, it should be appreciated that dependent upon design considerations, any number of calibration servo wedges may be utilized. Typically, during a calibration mode, the servo control system seeks and locks to the normal wedges 14, and then switches to a new sampling period to read both normal and calibration wedges in order to perform any needed diagnostic and calibration functions.

There are many problems associated with the previously described configuration of calibration tracks used in current disk drives. For example, when full wedges are utilized as the calibration servo wedges, the servo control system of the disk drive may accidentally lock onto one of the full calibration servo wedges 29 of one of the calibration tracks 13, instead of one of the full normal wedges 14 of a non-calibration track, resulting in a timing error and possibly causing the disk drive to fail. This is because there is no difference between the servo synch mark (SSM) utilized in the full calibration servo wedges of calibration tracks and the full normal servo wedges of non-calibration tracks. Further, when Mini-Wedges are utilized for the calibration servo wedges, the servo control that needs to be utilized to track along the Mini-Wedges is very computationally intensive.

SUMMARY OF THE INVENTION

The present invention relates to a rotating media storage device (RMSD) that has at least one calibration track with unique calibration servo synch marks ($SSM_c$s).

In one aspect, the invention may be regarded as an RMSD including a disk. The disk comprises a plurality of tracks including a calibration track having a plurality of normal servo wedges distributed around the calibration track. At least one of the normal servo wedges includes a normal servo synch mark ($SSM_N$). Further, at least one calibration servo wedge is distributed between a pair of normal servo wedges. The calibration servo wedge includes a calibration servo synch mark ($SSM_C$). Particularly, the calibration $SSM_C$ includes a pattern that is different than the pattern associated with the normal $SSM_N$.

In one embodiment, the RMSD may further include a head and a synch mark detection circuit having a normal synch mark detection mode and a calibration servo synch mark detection mode. In the normal synch mark detection mode, the synch mark detection circuit validates a servo synchronization signal based on the head detecting a normal $SSM_N$ associated with the normal servo wedge. On the other hand, in the calibration synch mark detection mode, the synch mark detection circuit validates a servo synchronization signal based on the head detecting a calibration $SSM_C$ associated with a calibration servo wedge.

In one embodiment, after the detection of a normal calibration $SSM_N$, a servo controller declares a calibration servo synch mark detection mode and sets a time to a next predicted calibration $SSM_C$. Next, after a calibration $SSM_C$ is detected, the servo controller declares a hard calibration servo synchronization mode based upon a forecasted pattern of calibration $SSM_C$s. Typically, the detection of a normal $SSM_N$ includes decoding an encoded pattern of a normal $SSM_N$, whereas detection of a calibration $SSM_C$ includes decoding an encoded pattern of a calibration $SSM_C$.

In one embodiment, each of the calibration servo wedges further includes a track identifier (TKID) field, a wedge identifier field, and a series of servo bursts. In one example, the calibration track may be located at the outer diameter of the disk. The calibration track may also be located at the inner diameter of the disk.

In a further aspect, the invention may be regarded as a method for switching a disk servo control system from a normal servo mode to a calibration servo mode. The normal servo mode is set by setting the servo control system to operate on a normal servo synch mark ($SSM_N$). Tracking occurs on a normal track using the normal $SSM_N$ to search for normal servo sectors. A calibration track may then be seeked to. Tracking occurs on the calibration track in the normal servo mode until an on-track condition is declared. Then, the calibration servo mode is set by setting the servo control system to operate on a calibration servo synch mark ($SSM_C$). Next, tracking occurs on the calibration track using the calibration servo synch mark $SSM_C$ to search for calibration servo sectors.

In yet another aspect, the invention may be regarded as a computer system including a host computer and an RMSD, in which the RMSD includes a disk having a plurality of tracks including a calibration track that has a plurality of normal servo wedges distributed around the calibration track, wherein at least one of the normal servo wedges includes a normal servo synch mark ($SSM_N$). Further, at least one calibration servo wedge is distributed between a pair of normal servo wedges. The calibration servo wedge includes a calibration servo synch mark ($SSM_C$). Particularly, the calibration $SSM_C$ includes a pattern that is different than a pattern associated with the normal $SSM_N$s.

The foregoing and other features of the invention are described in detail in the Detailed Description and are set forth in the appended claims.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Moreover, embodiments of the invention will be described in particular embodiments but may be implemented in hardware, software, firmware, middleware, or a combination thereof.

Figure 1:
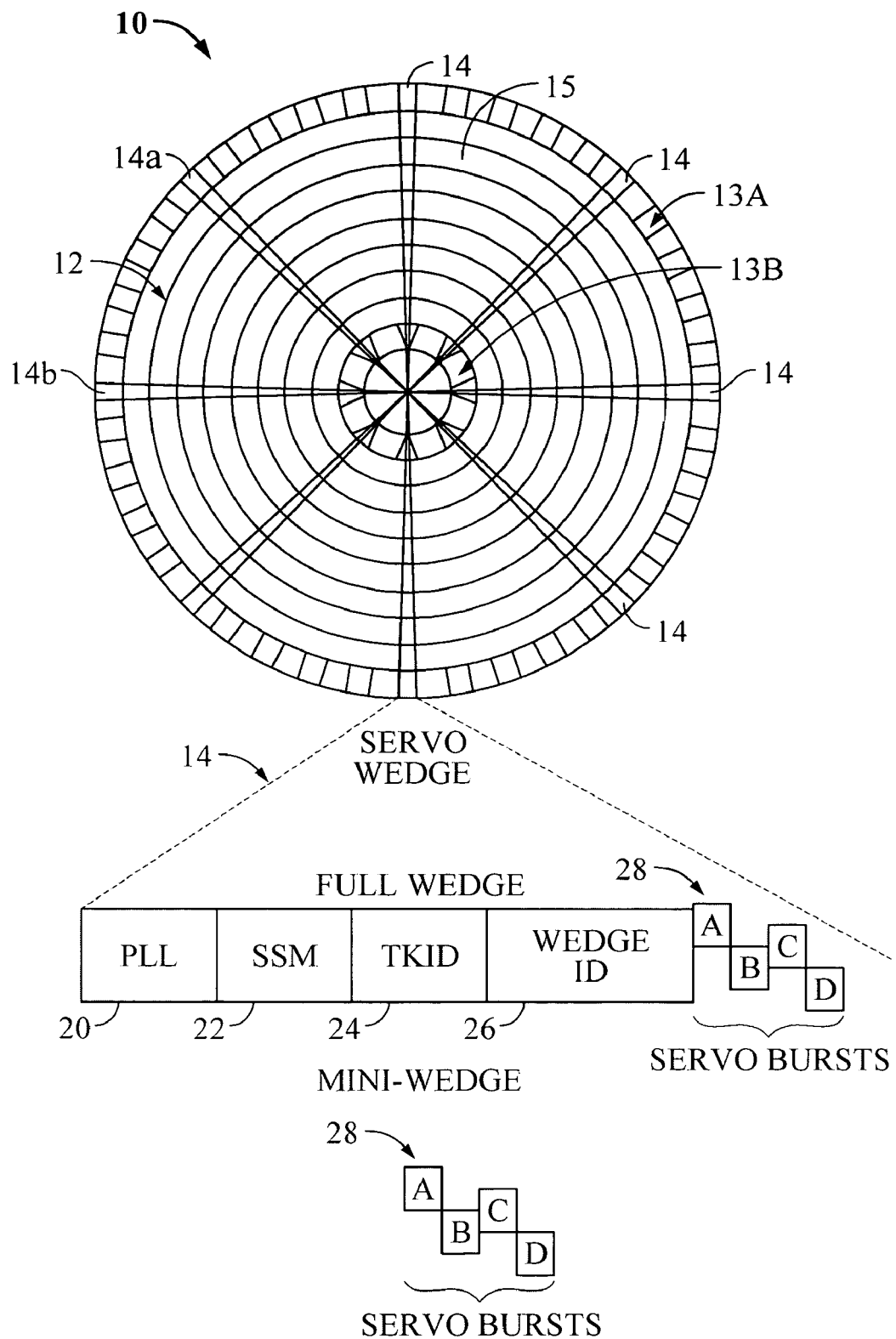
FIG. 1 shows a diagram illustrating an example of a prior art disk having a plurality of concentric tracks.
Figure 2:
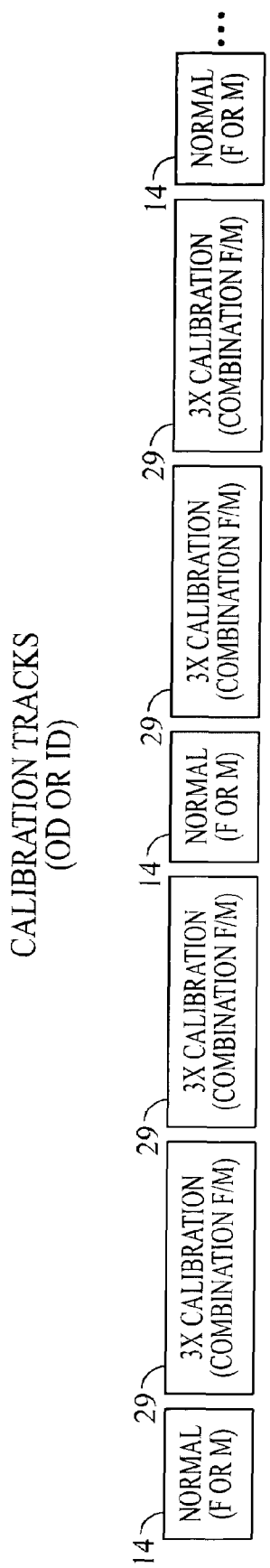
FIG. 2 shows a diagram illustrating an example of typical calibration tracks at the outer and/or inner diameter of a typical disk drive.
Figure 3:
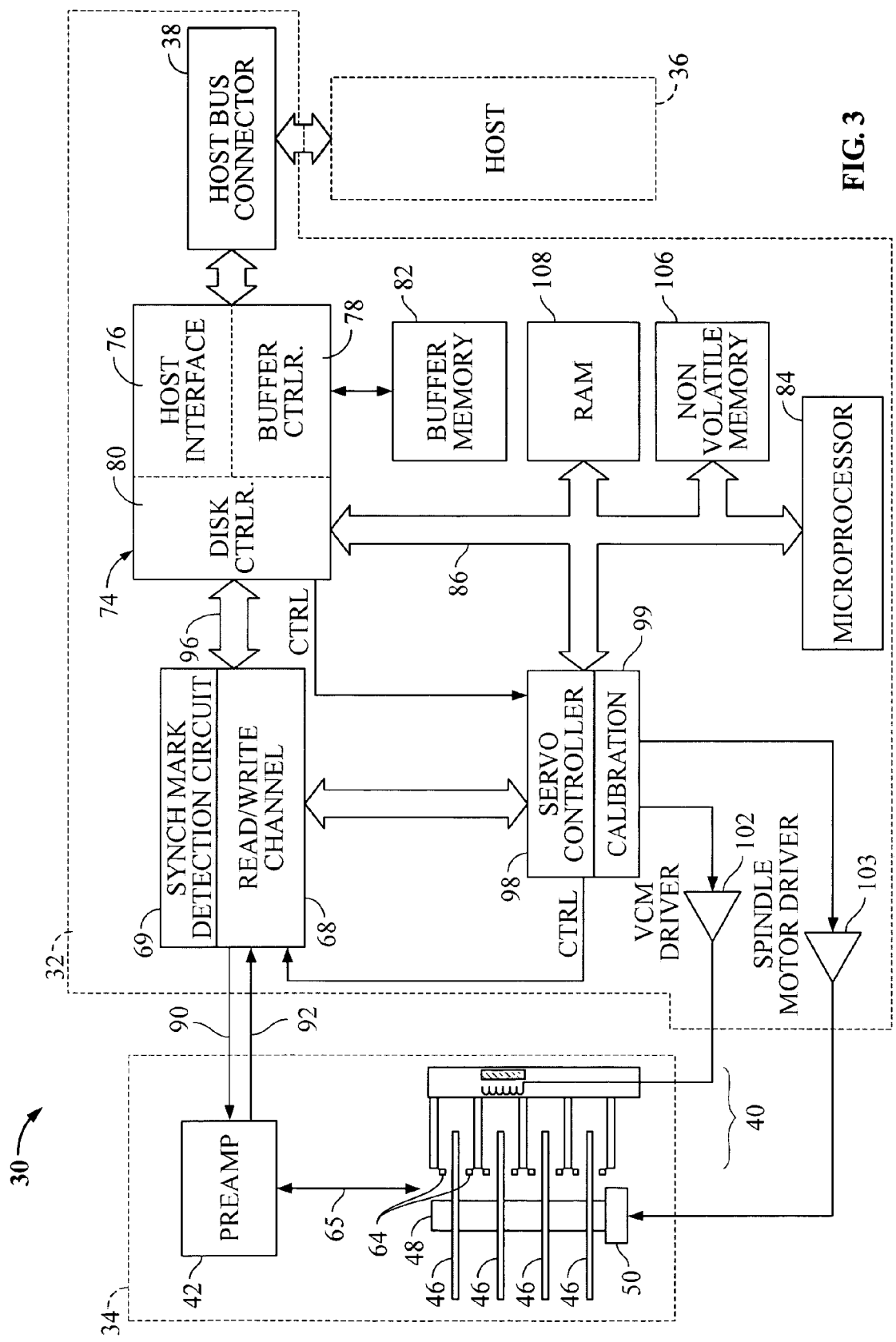
FIG. 3 shows a block diagram of a rotating media storage device (RMSD), such as a disk drive, connected to a host, in which embodiments of the invention may be practiced.

FIG. 3 shows a block diagram of a rotating media storage device (RMSD), such as a disk drive 30, connected to a host 36, in which embodiments of the invention may be practiced. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Read/write channel 68 may include a servo synch mark detection circuit 69, which under the control of a program or routine, may execute methods or processes in accordance with certain aspects of the invention to aid in servo synchronization based on the head reading and the synch mark detection circuit detecting both normal servo synch marks ($SSM_N$s) and calibration servo synch marks ($SSM_C$s), as will be discussed. For example, servo synch mark detection circuit 69 may be an application specific integrated circuit (ASIC) or other suitable type of circuit. Further, microprocessor 84 may pre-program the servo synch mark detection circuit 69 and/or initialize the servo synch mark detection circuit with initial and operational values to detect normal $SSM_N$s and calibration $SSM_C$s. Although the servo synch mark detection circuit 69 is shown as part of the read/write channel 68, it should be appreciated that it may be located elsewhere in the disk drive 30.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Further, servo controller 98 may include a calibration circuit 99, which under the control of a program or routine, may execute methods or processes in accordance with embodiments of the invention for switching the disk drive servo control system from a normal servo mode to a calibration servo mode, and vise-versa. For example, calibration circuit 99 may be an application-specific integrated circuit (ASIC) or other suitable type of circuit. Further, microprocessor 84 may pre-program the calibration circuit 99 and/or initialize the calibration circuit with initial and operational values.

Particularly, as will be discussed, calibration circuit 99 may include functionality to set a normal servo mode by setting the servo controller 98 to operate on a normal servo synch mark ($SSM_N$) to track on a normal track using normal $SSM_N$s to search for normal servo sectors and then to command the disk drive to seek to a calibration track. After this, the servo controller 98 will track on the calibration track (e.g. an inner or outer diameter track) in the normal servo mode until an on-track condition is declared and then the calibration circuit 99 will set the calibration servo mode by setting the servo controller 98 to operate on a calibration servo synch mark ($SSM_C$) and the servo control system will then track on the calibration track using calibration $SSM_C$s to search for calibration servo sectors.

The calibration mode is often utilized by a disk drive in order to properly diagnose and calibrate the servo control system. Additionally, it should be appreciated that the calibration functionality of the calibration circuit 99 may be implemented with microcode, software, hardware, firmware, combinations thereof, etc.

Figure 4:
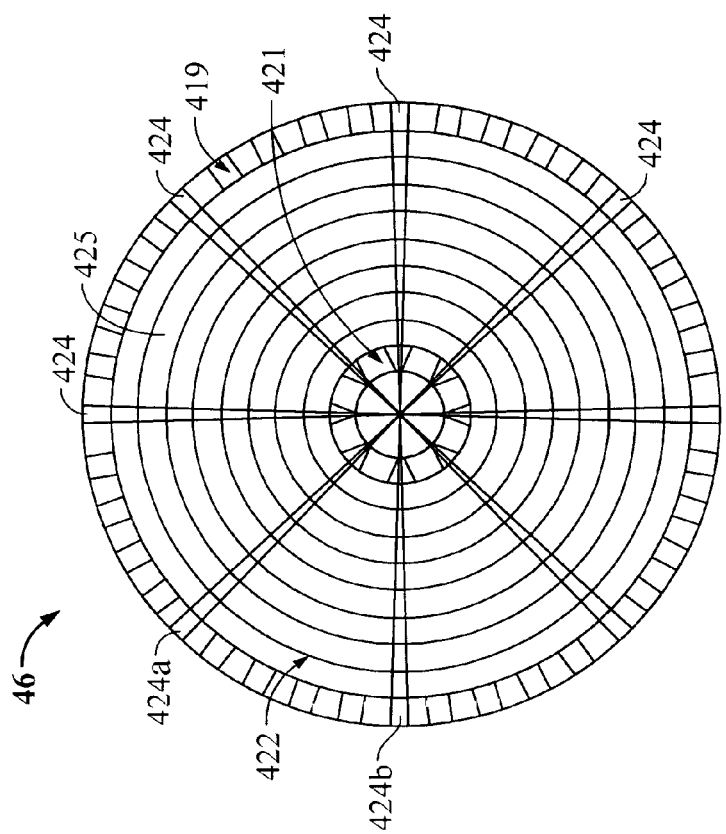
FIG. 4 shows a diagram illustrating a disk of the disk drive having a plurality of concentric tracks, and more particularly, illustrates outer diameter and inner diameter calibration tracks configured in accordance with embodiments of the present invention.
Figure 4:
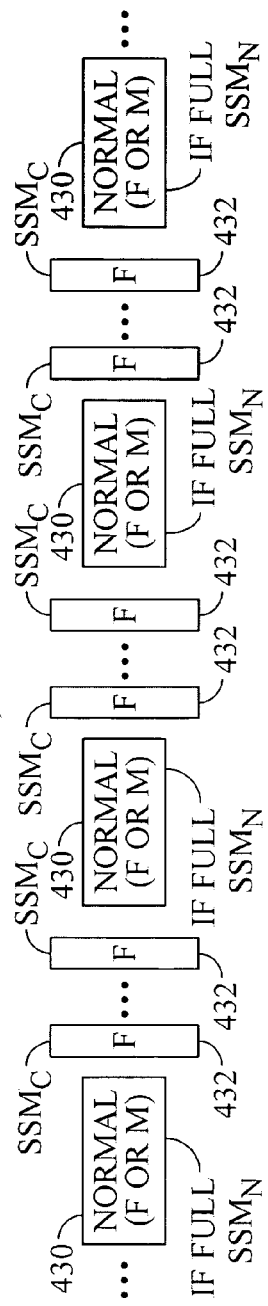

With reference also to FIG. 4, FIG. 4 shows a disk 46 of the disk drive 30 having a plurality of concentric tracks, and more particularly, illustrates outer diameter and inner diameter calibration tracks 419 and 421 configured in accordance with embodiments of the present invention. As is conventional, the disk 46 includes a plurality of concentric tracks 422. Each circumferential track includes a plurality of embedded servo wedges 424 utilized in track following. The plurality of servo wedges 424 are spaced sequentially around a circumference of the circumferential track 422. For example, the embedded servo wedges 424a, 424b, etc., contain servo information utilized in track following and are interspersed between data regions 425 of the disk 46. Data is conventionally written in the data regions 425 and a plurality of discrete data sectors. Each data region 425 is typically preceded by a servo wedge 424.

As is conventional, and as previously discussed, each full servo wedge 422 may include a phase lock loop (PLL) field, a servo synch mark (SSM) field, a track identification (TKID) field, a wedge identifier (ID), and a group of servo bursts that the servo control system samples to align the moveable transducer head with and relative to a particular track. Also, as is conventional, and as previously discussed, many of the servo wedges 424 may only utilize Mini-Wedges, instead of Full Wedges. The Mini-Wedges only include servo bursts, which are sampled by the servo control system to align the moveable transducer head with, and relative to, the particular track. In this way, disk drives may utilize more space in the data regions by using these reduced-spaced mini servo wedges.

Looking now particularly to the outer diameter and inner diameter calibration tracks 419, 421, according to the embodiments of the invention, the calibration tracks 419, 421 have a plurality of normal servo wedges 430 distributed around the calibration track. At least one of these normal servo wedges 430 is a full servo wedge including a normal servo synch mark ($SSM_N$). However, many of the normal servo wedges may be Mini-Wedges, dependent upon design considerations. For example, there may be an alternating pattern of normal full servo wedges 430 having a normal $SSM_N$ and normal mini servo wedges (without a normal $SSM_N$) around the calibration track. These configurations can be implemented dependent upon design considerations. However, the calibration track must include at least one normal full servo wedge with a normal $SSM_N$ and usually will contain a suitable number of full servo wedges and a suitable number of normal mini servo wedges, as applicable.

Further, as shown in FIG. 4, each of the outer diameter and inner diameter calibration tracks 419, 421 additionally include at least one full calibration servo wedge including a calibration servo synch mark ($SSM_C$) 432. As should be appreciated, a suitable number (e.g. 2×, 3×, 4×, 5×, etc.) of full calibration servo wedges 432 each having calibration $SSM_C$ are typically distributed between a pair of normal servo wedges, dependent upon design considerations.

Of particular importance, each calibration $SSM_C$ includes a pattern that is different than a pattern associated with the normal $SSM_N$ of the normal servo wedges. This, as will be discussed, allows the servo controller in a calibration servo mode to lock onto these full calibration servo wedges having $SSM_C$s, in an independent fashion from typical normal servo wedges, which have normal servo synch marks $SSM_N$s. It should be appreciated to those skilled in the art than any sort of calibration servo synch mark ($SSM_C$) having a different and distinguishable pattern from another servo synch mark, used as the normal servo synch mark $SSM_N$, may be utilized.

Figure 5:
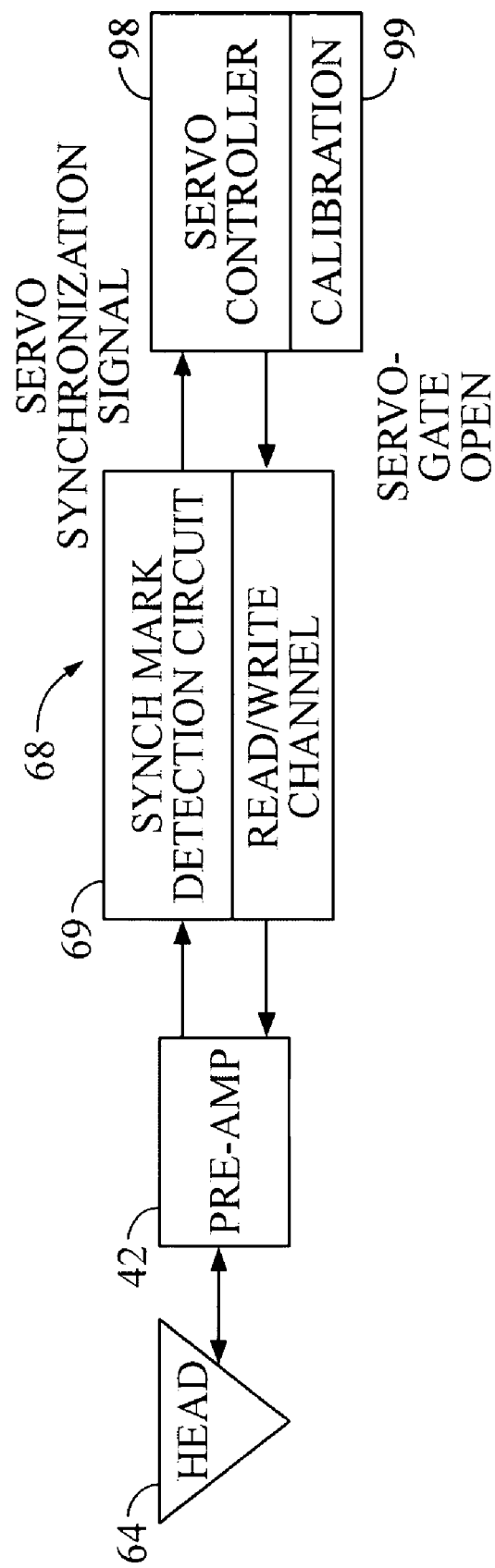
FIG. 5 shows a block diagram illustrating a simplified example of some of the components of the previously described disk drive that are relevant to the description of the implementation of the calibration servo mode.

Turning now to FIG. 5, FIG. 5 illustrates a simplified example of some of the components of the previously described disk drive 30 that are relevant to the description of the implementation of the calibration servo mode. As shown in FIG. 5, during the calibration servo mode, head 64 reads normal servo wedges and calibration servo wedges of the calibration tracks, and this data is amplified by pre-amp 42 and fed to the read/write channel 68, as previously discussed. Particularly, the read/write channel 68 includes a synch mark detection circuit 69 that implements a normal synch mark detection mode and a calibration servo synch mark detection mode.

In the normal synch mark detection mode, the synch mark detection circuit 69 validates a servo synchronization signal based on the head 64 reading a valid normal $SSM_N$ associated with a normal servo wedge. In response to the valid servo synchronization signal for the normal $SSM_N$ the servo controller 98 having calibration microcode 99 (previously discussed) opens up the servo-gate through the read/write channel 68, preamp 42, and head 64, in order to next detect a full calibration servo wedge having a calibration $SSM_C$. Further, the synch mark detection circuit 69 includes a calibration synch mark detection mode, in which the synch mark detection circuit 69 validates a servo synchronization signal based on the head reading a valid calibration $SSM_C$ associated with a calibration servo wedge.

Particularly, after the detection of a normal calibration $SSM_N$ of a normal servo wedge, the servo controller 98 under the control of calibration program 99 declares a calibration servo synch mark detection mode and sets a time to a next predicted calibration $SSM_C$, such that the opening of the servo-gate is appropriately timed for the detection of the next predicted calibration $SSM_C$. After a calibration $SSM_C$ is detected, the servo controller 98 declares a hard calibration servo synchronization mode based upon a forecasted pattern of calibration $SSM_C$s, and associated times between each calibration $SSM_C$, such that the servo-gate openings are properly timed in order to accurately read and detect the calibration $SSM_C$s.

It should be appreciated that the detection of normal $SSM_N$s typically includes the decoding of encoded patterns of the normal $SSM_N$s and, similarly, the detection of calibration $SSM_C$s includes decoding the encoded patterns of the calibration $SSM_C$s. Further, it should be appreciated that the full calibration servo wedges having different patterned calibration $SSM_C$s than normal $SSM_N$s are typically full wedges including a track identifier (TKID) field, a wedge identifier field, and a series of servo bursts.

Figure 6:
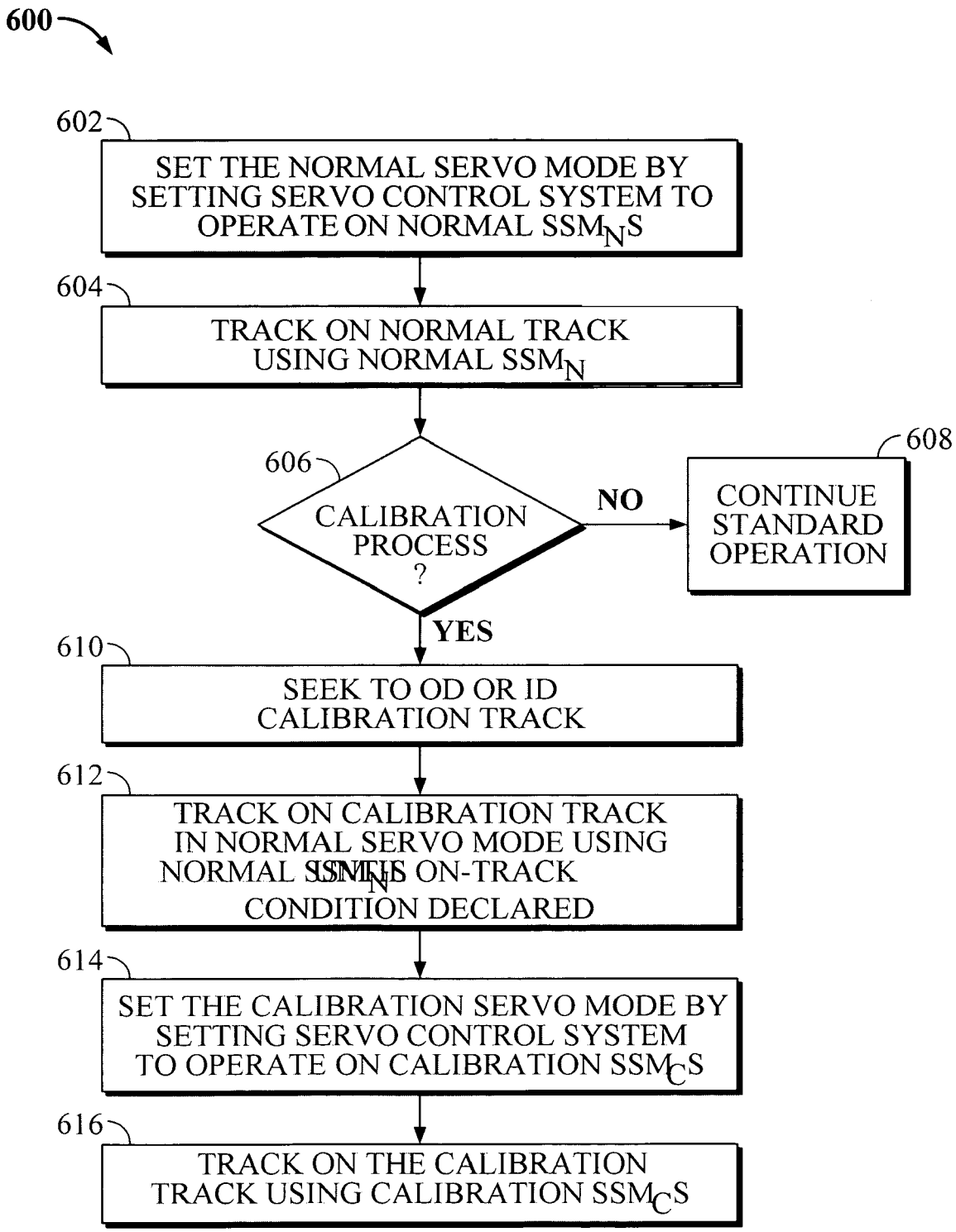
FIG. 6 shows a flow diagram illustrating a method for switching a disk drive servo control system from a normal servo mode to a calibration servo mode.

Turning now to FIG. 6, FIG. 6 shows a flow diagram 600 illustrating a method for switching a disk drive servo control system from a normal servo mode to a calibration servo mode. At step 602, the normal servo mode is set by setting the servo control system to operate on normal servo synch marks ($SSM_N$s). The servo control system then tracks along a normal track using normal $SSM_N$s to search for normal servo sectors (block 604). At step 606, it is determined whether the disk drive has been commanded to enter into a calibration process (step 606). If not, standard operations continue (step 608).

However, if the servo control system has been commanded to enter into a calibration process, the servo control system commands that the head of the disk drive seek to either an outer diameter or an inner diameter calibration track (step 610). At step 612, once the calibration track has been found, the servo control system tracks on the calibration track in the normal servo mode using normal $SSM_N$s until an on-track condition is declared. Then, at step 614, the calibration servo mode is set by setting the servo control system to operate on calibration $SSM_C$s. The servo control system then tracks on the calibration track using the calibration $SSM_C$s to search for calibration servo sectors (step 616).

As previously discussed, in one embodiment, in order to implement the above-described method, the calibration $SSM_C$ includes a pattern that is different than a pattern associated with the normal $SSM_N$. Further, as has been previously described, after the detection of a normal $SSM_N$, a calibration synch mark detection mode is declared and a time to a next predicted calibration $SSM_C$ is set. After the calibration $SSM_C$ is detected, then a hard calibration servo synchronization mode is declared, in which tracking occurs on the calibration track using calibration $SSM_C$s, based upon a forecasted pattern of calibration $SSM_C$s.

Figure 7:
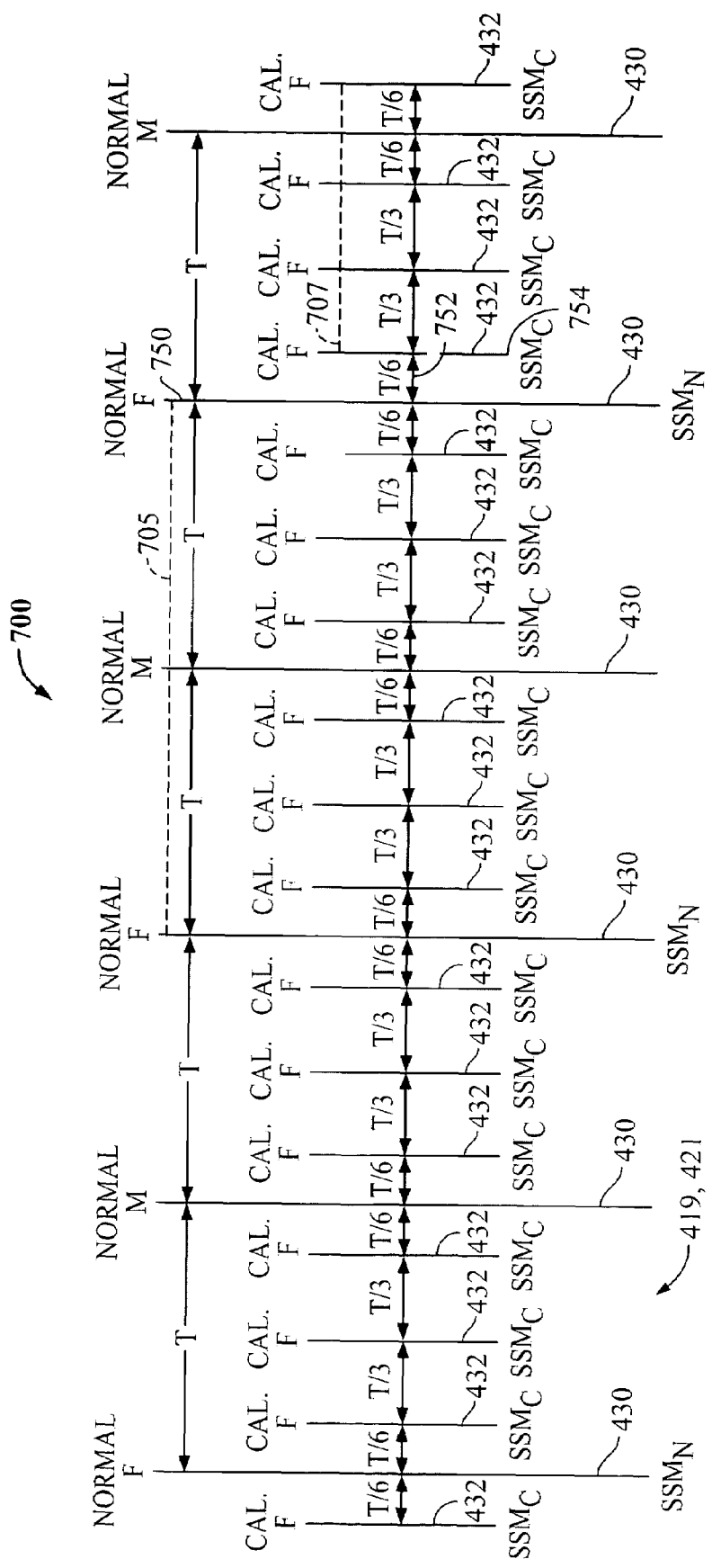
FIG. 7 shows a diagram illustrating an example of how calibration servo synch marks ($SSM_C$s) and normal servo synch marks ($SSM_N$s) are laid out on a calibration track, according to one embodiment of the present invention.

In order to illustrate the previously described calibration process, reference may also be made to FIG. 7, which illustrates an example of how calibration servo synch marks ($SSM_C$s) and normal servo synch marks ($SSM_N$s) are laid out on a calibration track and how the servo control system may utilize these different servo synch marks in order to implement the previously described calibration servo mode, according to one embodiment of the present invention.

As can be seen in FIG. 7, normal wedges 430 having a normal $SSM_N$ and a normal Mini-Wedges without a normal $SSM_N$ are periodically distributed along a calibration track (e.g. outer diameter or inner diameter calibration track 419, 421) in intervals of T. Further, full calibration servo wedges 432 each having a calibration $SSM_C$ are distributed along the calibration track in intervals of T/3 distributed between the normal servo wedges. Particularly, in this example, there are three full calibration wedges 432 distributed between each pair of normal servo wedges.

As shown in FIG. 7, the servo control system, represented by line 705 first tracks along the calibration track in a normal servo mode by detecting the normal servo wedges 430 and then the servo control system is set to a calibration servo mode to operate on the calibration $SSM_C$s of the full calibration servo wedges and then the servo control system, represented by line 707, tracks along each calibration $SSM_C$ of each full calibration servo wedge 432.

Particularly, as can be seen in FIG. 7, after the detection of the normal $SSM_N$ value of the normal servo wedge 750, the calibration servo mode is set by the servo control system to operate on calibration $SSM_C$s and a time (T/6) [represented by arrow 752] is set to a next predicted calibration $SSM_C$ 754. After this next calibration $SSM_C$ 754 is detected, the hard calibration synchronization mode is declared based upon a forecasted pattern of calibration $SSM_C$s.

For example, as shown in FIG. 7, based on the pre-recorded normal servo wedges 430 and calibration servo wedges 432 of the disk, the servo control system knows that every full calibration servo wedge 432 having a $SSM_C$ occurs at intervals of T/3, and based on this predetermined timing, the servo control system accordingly open the servo-gate at properly time intervals to validate each upcoming $SSM_C$ of each full calibration wedge. It should be appreciated that any timing format can be utilized dependent upon the number of full calibration wedges distributed between the normal full wedges (e.g., T/2 for two full calibration wedges, T/4 for four full calibration servo wedges, etc.).

Figure 8A:
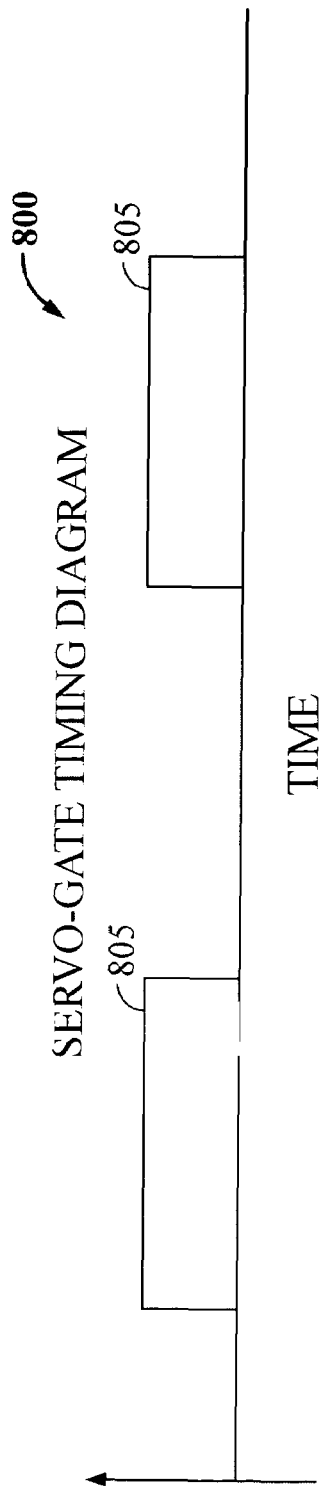
FIG. 8A shows a timing diagram illustrating the opening of the servo-gate as the servo control system tracks on the calibration track in the normal servo mode searching for normal full wedges having a normal servo synch mark ($SSM_N$).

Turning now to FIG. 8A, FIG. 8A shows a timing diagram 800 illustrating the opening of the servo-gate as the servo control system tracks on the calibration track in the normal servo mode searching for normal full wedges having a normal servo synch mark ($SSM_N$). Particularly, as shown in the timing diagram 800 the opening of the servo-gate can be represented by a series of pulses 805 representing each time the servo-gate is opened to search for an $SSM_N$ of a full normal servo wedge on the calibration track.

Figure 8B:
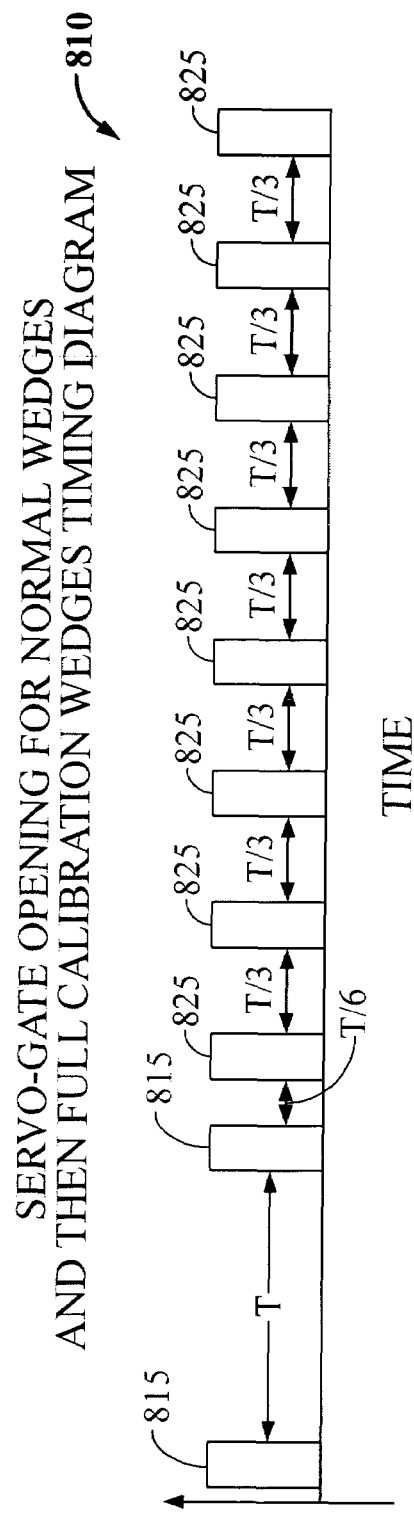
FIG. 8B shows a timing diagram illustrating the servo-gate opening for normal wedges based upon a forecasted pattern of normal wedges and then opening for each of the predicted calibration servo synch marks ($SSM_C$s) associated with each of the forecasted calibration servo wedges.

Now turning to FIG. 8B, FIG. 8B shows a timing diagram illustrating the servo-gate opening for normal wedges based upon a forecasted pattern of normal wedges and then opening for each of the predicted calibration servo synch marks ($SSM_C$s) associated with each of the forecasted calibration servo wedges. Particularly, once a normal servo synch mark ($SSM_N$) has been found the servo-gate may be opened to find upcoming normal servo wedges based upon a forecasted pattern of normal wedges. As previously described, the servo control system tracks on the calibration track in the normal servo mode until a normal servo synch mark ($SSM_N$) of a normal servo wedge is detected.

Once one or more $SSM_N$s have been detected, an on-track condition is declared and the servo-gate will open as represented by pulses 815 separated by pre-determined timing interval T in a hard servo synchronization mode in order to detect upcoming normal servo wedges (full or mini). After a predetermined number of normal servo wedges are detected, the servo control system may switch to the calibration servo mode.

As previously discussed, the calibration servo mode is initiated by setting the servo control system to operate on calibration servo synch marks ($SSM_C$s). More particularly, as previously discussed, a time is set to a next predicted calibration $SSM_C$. In this case, as shown in FIG. 8B, the time is T/6. Thus, the first calibration $SSM_C$ is detected by the servo-gate opening (pulse 825) after T/6. Then a hard calibration servo synchronization mode is declared for the calibration servo wedges based upon a forecasted pattern on calibration $SSM_C$s.

Particularly, pulses 825 shown in timing diagram 820, illustrate the servo-gate opening to read the calibration $SSM_C$ for each full calibration servo wedge at intervals of T/3 in order to implement the calibration servo mode. Thus, at every T/3 interval, the servo-gate opens (pulse 825) to read the $SSM_C$ of the next predicted calibration servo wedge.

By utilizing full calibration servo wedges having their own independent calibration servo synch mark $SSM_C$ that utilizes a different pattern than the normal servo synch marks $SSM_N$s, the calibration servo wedges are independent from the normal servo wedges and are less likely to be confused with the normal servo synch marks $SSM_N$s. Further, by utilizing full calibration servo wedges having their own calibration servo synch mark $SSM_C$, the implementation logic required to implement the calibration servo mode is much simpler than if Mini-Wedges are utilized, which would require a more complex methodology to track the Mini-Wedges.

The methods and structures previously discussed can be employed for disk drives with an embedded servo system. However, numerous alternatives for RMSDs with similar or other media format characteristics can be employed by those skilled in the art to use the invention with equal advantage to implement these techniques. Further, although embodiments have been described in the context of a disk drive with embedded servo sectors, the invention can be employed in many different types of RMSDs having a head actuator that scans the media.

I claim:

1. A rotating media storage device (RMSD) comprising:
   a head;
   a disk including:
   a plurality of tracks including a calibration track having a plurality of normal servo wedges distributed around the calibration track, at least one of the normal servo wedges including a normal servo synch mark ($SSM_N$); and
   at least one calibration servo wedge distributed between a pair of normal servo wedges, the calibration servo wedge including a calibration servo synch mark ($SSM_C$), wherein the calibration $SSM_C$ includes a pattern that is different than a pattern associated with the normal $SSM_N$; and
   a synch mark detection circuit having a normal synch mark detection mode and a calibration servo synch mark detection mode, wherein, in the normal synch mark detection mode, the synch mark detection circuit validates a servo synchronization signal based on the head detecting a normal $SSM_N$ associated with a normal servo wedge, and in the calibration synch mark detection mode, the synch mark detection circuit validates a servo synchronization signal based on the head detecting a calibration $SSM_C$ associated with a calibration servo wedge.

2. The RMSD of claim 1, wherein after the detection of a normal calibration $SSM_N$, a servo controller declares a calibration servo synch mark detection mode and calculates a time to a next predicted calibration $SSM_C$.

3. The RMSD of claim 2, wherein after a calibration $SSM_C$ is detected, the servo controller declares a hard calibration servo synchronization mode based upon a forecasted pattern of calibration $SSM_C$s.

4. The RMSD of claim 1, wherein detection of a normal $SSM_N$ includes decoding an encoded pattern of a normal $SSM_N$.

5. The RMSD of claim 1, wherein detection of a calibration $SSM_C$ includes decoding an encoded pattern of a calibration $SSM_C$.

6. The RMSD of claim 1, wherein each of the calibration servo wedges further includes a track identifier (TKID) field, a wedge identifier field, and a series of servo bursts.

7. The RMSD of claim 1, wherein the calibration track is located at the outer diameter of the disk.

8. The RMSD of claim 1, wherein the calibration track is located at the inner diameter of the disk.

9. A method for switching a disk drive servo control system from a normal servo mode to a calibration servo mode, the method comprising:
   setting the normal servo mode by setting the servo control system to operate on a normal servo synch mark ($SSM_N$), wherein the normal $SSM_N$ includes a first pattern;
   tracking on a normal track using the normal $SSM_N$ to search for normal servo sectors;
   seeking to a calibration track;
   tracking on the calibration track in the normal servo mode until an on-track condition is declared; then
      setting the calibration servo mode by setting the servo control system to operate on a calibration servo synch mark ($SSM_C$); and
      tracking on the calibration track using the calibration servo synch mark $SSM_C$ to search for calibration servo sectors, wherein the calibration $SSM_C$ includes a second pattern that is different than the first pattern associated with the normal $SSM_N$.

10. The method of claim 9, further comprising:
   detecting a normal $SSM_N$ to validate a servo synchronization signal as part of a normal synch mark detection mode; and
   detecting a calibration $SSM_C$ to validate a servo synchronization signal as part of a calibration synch mark detection mode.

11. The method of claim 10, wherein after the detection of a normal $SSM_N$, further comprising declaring the calibration synch mark detection mode and calculating a time to a next predicted calibration $SSM_C$.

12. The method of claim 11, wherein after the calibration $SSM_C$ is detected, further comprising declaring a hard calibration servo synchronization mode based upon a forecasted pattern of calibration $SSM_C$s.

13. The method of claim 10, wherein detection of a normal $SSM_N$ includes decoding an encoded pattern of a normal $SSM_N$.

14. The method of claim 10, wherein detection of a calibration $SSM_C$ includes decoding an encoded pattern of a calibration $SSM_C$.

15. The method of claim 9, wherein the calibration track is located at the outer diameter of the disk.

16. The method of claim 9, wherein the calibration track is located at the inner diameter of the disk.

17. A computer system comprising a host computer and a rotating media storage device (RMSD), the RMSD comprising:
   a disk having a plurality of tracks including a calibration track having a plurality of normal servo wedges distributed around the calibration track, at least one of the normal servo wedges including a normal servo synch mark ($SSM_N$) for synchronizing track-following in a normal servo mode, wherein the normal $SSM_N$ includes a first pattern; and
   at least one calibration servo wedge distributed between a pair of normal servo wedges, the calibration servo wedge including a calibration servo synch mark ($SSM_C$) for synchronizing track-following in a calibration servo mode, wherein the calibration $SSM_C$ includes a second pattern that is different than the first pattern associated with the normal $SSM_N$.

18. The computer system of claim 17, further comprising a head and a synch mark detection circuit having a normal synch mark detection mode and a calibration servo synch mark detection mode, wherein, in the normal synch mark detection mode, the synch mark detection circuit validates a servo synchronization signal based on the head detecting a normal $SSM_N$ associated with a normal servo wedge, and in the calibration synch mark detection mode, the synch mark detection circuit validates a servo synchronization signal based on the head detecting a calibration $SSM_C$ associated with a calibration servo wedge.

19. The computer system of claim 18, wherein after the detection of a normal $SSM_N$, a servo controller declares a calibration servo synch mark detection mode and calculates a time to a next predicted calibration $SSM_C$.

20. The computer system of claim 19, wherein after the calibration $SSM_C$ is detected, the servo controller declares a hard calibration servo synchronization mode based upon a forecasted pattern of calibration $SSM_C$s.

21. The computer system of claim 18, wherein detection of a normal $SSM_N$ includes decoding an encoded pattern of a normal $SSM_N$.

22. The computer system of claim 18, wherein detection of a calibration $SSM_C$ includes decoding an encoded pattern of a calibration $SSM_C$.

23. The computer system of claim 17, wherein each of the calibration servo wedges further includes a track identifier (TKID) field, a wedge identifier field, and a series of servo bursts.

24. The computer system of claim 17, wherein the calibration track is located at the outer diameter of the disk.

25. The computer system of claim 17, wherein the calibration track is located at the inner diameter of the disk.

26. A rotating media storage device (RMSD) including a disk, the disk comprising:
   a plurality of tracks including a calibration track having a plurality of normal servo wedges distributed around the calibration track, at least one of the normal servo wedges including a normal servo synch mark ($SSM_N$) for synchronizing track-following in a normal servo mode, wherein the normal $SSM_N$ includes a first pattern; and
   at least one calibration servo wedge distributed between a pair of normal servo wedges, the calibration servo wedge including a calibration servo synch mark ($SSM_C$) for synchronizing track-following in a calibration servo mode, wherein the calibration $SSM_C$ includes a second pattern that is different than the first pattern associated with the normal $SSM_N$.

* * * * *